O. BALLERT.
TIPPING TRUCK.
APPLICATION FILED NOV. 3, 1921.

1,405,182. Patented Jan. 31, 1922.

Inventor:
Otto Ballert

UNITED STATES PATENT OFFICE.

OTTO BALLERT, OF BERLIN, GERMANY.

TIPPING TRUCK.

1,405,182.     Specification of Letters Patent.     Patented Jan. 31, 1922.

Application filed November 3, 1921. Serial No. 512,671.

*To all whom it may concern:*

Be it known that I, OTTO BALLERT, head engineer, citizen of the State of Prussia, residing at Berlin, in the State of Prussia, Germany, have invented certain new and useful Improvements in Tipping Trucks, of which the following is a specification.

This invention relates to a rearwardly discharging tipping truck with swinging winches and in accordance with this invention a rack winch is attached to each side of the truck in such a manner that the rack and its shell may swing upon the axle of the driving cog-wheel or pinion, the arrangement being such that each rack winch may also be turned into a horizontal or nearly horizontal position and may be secured in this position to the truck when not employed for tipping the truck body or returning the body after the tipping operation.

The invention, in its form at present preferred, has the upper end of each rack, the so-called rack head, directly connected with the frame of the tipping body in a manner allowing turning or swinging of the racks in vertical planes, and has the axle or the joint of each rack head so constructed that, after the body has moved back into its normal position and is again supported by the truck frame, the racks may be swung into horizontal or approximately horizontal position with their casings by continuing rotating the crank provided for the actuation of the movable parts of the structure.

This is attained by the fulcrum of each rack at the body of the truck being so shaped and positioned that when the body re-assumes its normal position upon the chassis said fulcrum lies close at the centre of rotation, or pivot respectively, of the respective rack winch which is suspended from the chassis and may swing at it, whereby the two fulcrums (that of the rack at the body and that of the rack shell at the chassis) are made to lie in the same axis of rotation.

The effect of this arrangement is that by continuing the rotation of the crank after the body has re-assumed its normal position the rack winches are turned into horizontal position in which they then are secured by special means provided for this purpose.

Figure 1:
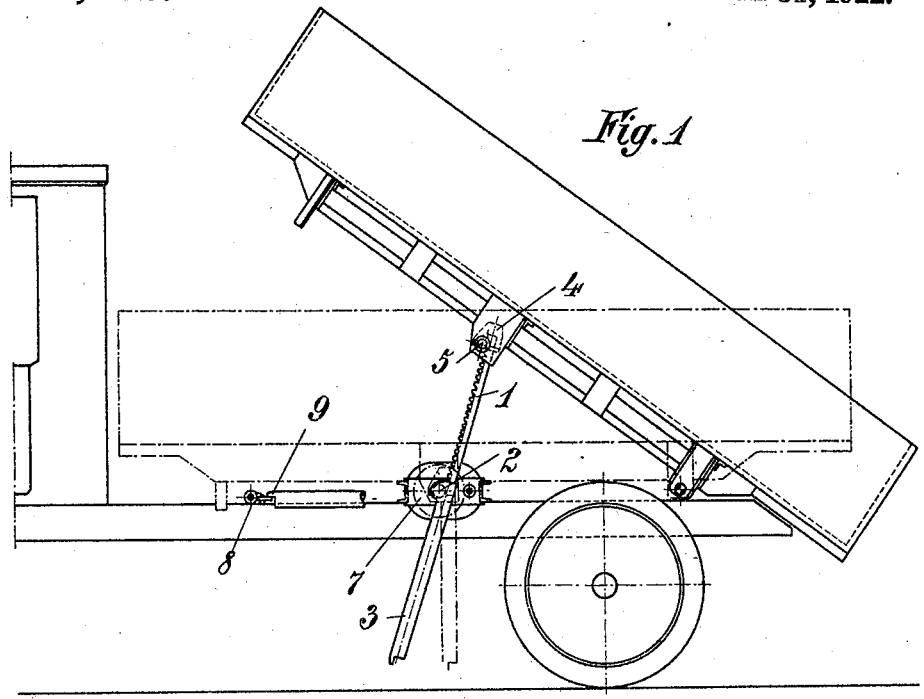
Figure 3:
Figure 2:
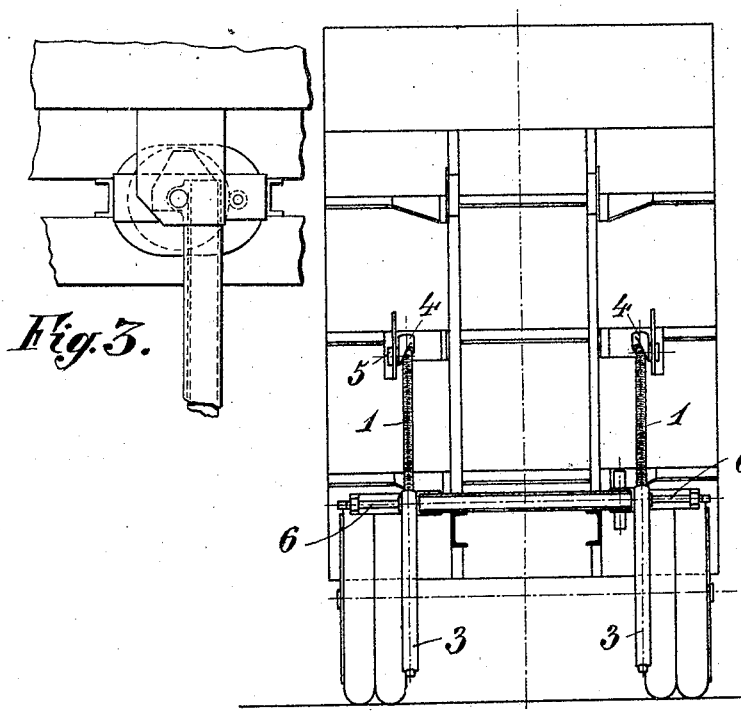

In order to more clearly describe my invention I refer to the accompanying drawing, in which similar numbers of reference denote similar parts, and in which Figure 1 is a side view of the rear portion of a tipping truck constructed according to this invention, the body being shown in tipping position, Figure 2 shows the tipped body seen in the direction from the front to the rear, together with some parts of the chassis of the truck, and Figure 3 is a detail view showing the body in its normal position on the chassis.

There are two rack winches, only one of which will be described since the other is of the same construction. The rack 1 of the rack winch is guided in a shell or casing 3 which is hinged at 2 to the chassis of the truck. The rack 1 has a head 4 which is hinged at 5 to the bottom structure of the body. The rack meshes with a gearing 7 which may be actuated by a crank (not shown) affixed to the shaft 6. By turning the crank in the one or the other direction the gearing lifts or lowers the racks together with the body. Each rack and its shell are, of course, always in the same line and when having arrived in the position of rest, each rack with its shell may be turned into horizontal position, in which the parts are held by a rotary locking member 8 which engages a lug 9 provided at the lower end of the shell 3. When disengaging the parts 8 and 9, the respective rack and its shell swing down into vertical position which is possible because of the fulcrums of these parts lying in the same axial line, as above described.

Having now described my invention, what I desire to secure by a patent of the United States is:

1. In a tipping truck, the combination of a chassis; a body pivotally mounted on the chassis; means for tipping the body comprising a rack pivoted on the body; and a guide for the rack pivotally mounted on the chassis, the axis of pivotal movement of the guide coinciding with the axis of pivotal movement of the rack when the body is in normal position supported directly by the chassis.

2. In a tipping truck, the combination of a chassis; a body pivotally mounted on the chassis; means for tipping the body comprising a rack pivoted on the body and an operating pinion mounted on the chassis and engaging the rack; and a guide for the rack pivotally mounted on the chassis, the axis of pivotal movement of the guide coinciding with the axis of pivotal movement of the rack when the body is in normal position supported directly upon the chassis, the operation of the pinion after said body is in normal position causing the rack and guide therefor to be swung into position substantially parallel with the chassis.

3. In a tipping truck, the combination of a chassis; a body pivotally mounted on the chassis; means for tipping the body comprising a rack pivoted on the body; a sheath for the rack pivotally mounted on the chassis, the axis of pivotal movement of the rack coinciding with the axis of pivotal movement of the sheath when the body is in normal position supported directly by the chassis.

4. In a tipping truck, the combination of a chassis; a body pivotally mounted on the chassis; means for tipping the body comprising a rack pivoted on the body and vertically disposed when in use; and a guide for the rack pivotally mounted on the chassis, the axis of pivotal movement of the rack coinciding with the axis of pivotal movement of the guide when the body is in normal position supported by the chassis, said coincidence of the axes permitting the rack to be swung into horizontal position; and means for holding the rack in horizontal position.

5. In a tipping truck, the combination of a chassis; a body pivotally mounted on the chassis; means for tipping the body comprising a rack pivoted on the body and vertically disposed when in use; and a sheath for said rack pivotally mounted on the chassis, the axis of pivotal movement of the rack coinciding with the axis of pivotal movement of the sheath when the body is in normal position supported by the chassis, said coincidence of the axes permitting the rack and sheath to be swung into horizontal position; and means for engaging the sheath and holding the sheath and the rack it contains in horizontal position.

6. In a tipping truck, the combination of an operating rack and sheath therefor, said rack and sheath being vertically disposed when in use and movable to a horizontal position when not in use; and a pivoted catch for holding the sheath in horizontal position.

In testimony whereof I have affixed my signature.

OTTO BALLERT.